United States Patent
Smith et al.

(10) Patent No.: US 6,829,714 B2
(45) Date of Patent: Dec. 7, 2004

(54) METHOD FOR TIMED BOOTING OF LOGICAL PARTITIONS IN A COMPUTER SYSTEM IN ACCORDANCE WITH A PRESET SCHEDULE STORED IN NONVOLATILE MEMORY

(75) Inventors: Timothy Albert Smith, Austin, TX (US); John Kwangil Chang, Austin, TX (US); Robert Kimberlin Foster, Austin, TX (US); Thomas Alois Kriz, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 09/798,168

(22) Filed: Mar. 1, 2001

(65) Prior Publication Data

US 2002/0124165 A1 Sep. 5, 2002

(51) Int. Cl.$^7$ ................................................. G06F 1/26
(52) U.S. Cl. .......................... 713/330; 713/600; 713/1
(58) Field of Search .................... 713/1, 600; 714/36; 709/219

(56) References Cited

U.S. PATENT DOCUMENTS

| | | | | |
|---|---|---|---|---|
| 4,355,361 A | * | 10/1982 | Riggs et al. | 713/600 |
| 5,426,775 A | * | 6/1995 | Boccon-Gibod | 714/36 |
| 6,625,478 B1 | * | 9/2003 | Nonogaki | 455/574 |
| 6,633,905 B1 | * | 10/2003 | Anderson et al. | 709/219 |

* cited by examiner

Primary Examiner—Thomas Lee
Assistant Examiner—P. Chandrasekhar
(74) Attorney, Agent, or Firm—Sawyer Law Group LLP

(57) ABSTRACT

A method and system for providing a timed power-on of logical partitions in a logical partition computer system is disclosed. An operator is allowed to enter a timed power-on value (TPO) value representing a time to boot one or more of the logical partitions. The TPO value for each of the logical partitions is then stored in nonvolatile memory. The system time is then periodically compared with each of the TPO values, and the corresponding partition is booted when the system time is greater than or equal to the TPO value.

32 Claims, 2 Drawing Sheets

METHOD FOR TIMED BOOTING OF LOGICAL PARTITIONS IN A COMPUTER SYSTEM IN ACCORDANCE WITH A PRESET SCHEDULE STORED IN NONVOLATILE MEMORY

FIELD OF THE INVENTION

The present invention relates to multiprocessor computer systems, and more particularly to a method and system for timed partition power-on in a logical partition multiprocessor computer system.

BACKGROUND OF THE INVENTION

Logical partitioning is the ability to make a single multiprocessing system run as if it were two or more independent systems. Each logical partition represents a division of resources in the system and operates as an independent logical system. Each partition is logical because the division of resources may be physical or virtual. An example of logical partitions is the partitioning of a multiprocessor computer system into multiple independent servers, each with it own processors, main storage, and I/O devices.

A multiprocessing system is typically designed with a timed power-on capability that allows an operator to schedule the time that the system automatically boots after a power-down. However, such systems currently do not provide the capability of allowing for a timed boot or restart for the logical partitions.

Accordingly, what is needed is a method and system for providing a timed restart for the partitions in a logical partition computer system. The present invention addresses such a need.

SUMMARY OF THE INVENTION

The present invention provides a method and system for providing a timed power-on of logical partitions in a logical partition computer system. An operator is allowed to enter a timed power-on value (TPO) value representing a time to boot one or more of the logical partitions. The TPO value for each of the logical partitions is then stored in nonvolatile memory. The system time is then periodically compared with each of the TPO values, and the corresponding logical partition is booted when the system time is greater than or equal to the TPO value.

Accordingly, the present invention allows an operator to issue TPO commands for multiple partitions with different time bases, establishes an accurate base timeline, and starts each partition independently upon the arrival of the scheduled time.

DESCRIPTION OF THE INVENTION

The present invention relates to the timed power-on of logical partitions in a logical partition computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
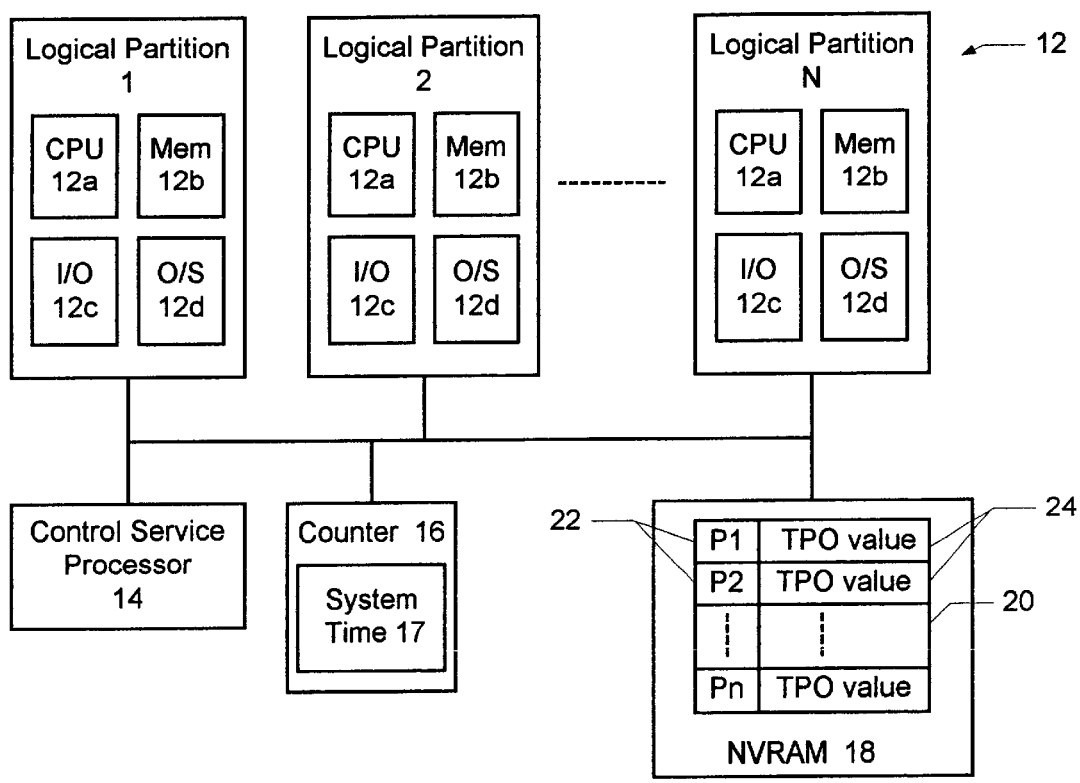
FIG. 1 is a block diagram illustrating a logical partition (LPAR) computer system.

FIG. 1 is a block diagram illustrating a logical partition (LPAR) computer system for use in accordance with a preferred embodiment of the present invention. The system 10 includes multiple logical partitions 12, a control service processor 14, a counter 16, and a nonvolatile random access memory (NVRAM) 18. In a preferred embodiment, the system 10 may have up to sixteen logical partitions 12.

Each logical partition 12 has its own processor(s) 12a, memory 12b, and I/O devices 12c, and may run its own operating system 12d independently of the other logical partitions 12. The control service processor 14 monitors the logical partitions 12 and is coupled to the counter 16 and the NVRAM 18. The counter 16 maintains system time 17, which in a preferred embodiment, is a 49-bit value that represents a number of time ticks that have elapsed relative to a defined system date/time reference. Preferably, the counter 16 is battery backed or loaded with the value of a battery backed-up real-time clock (not shown) upon system power-up, and upon power down, ensures that the real-time clock is in sync with the system time.

Figure 2:
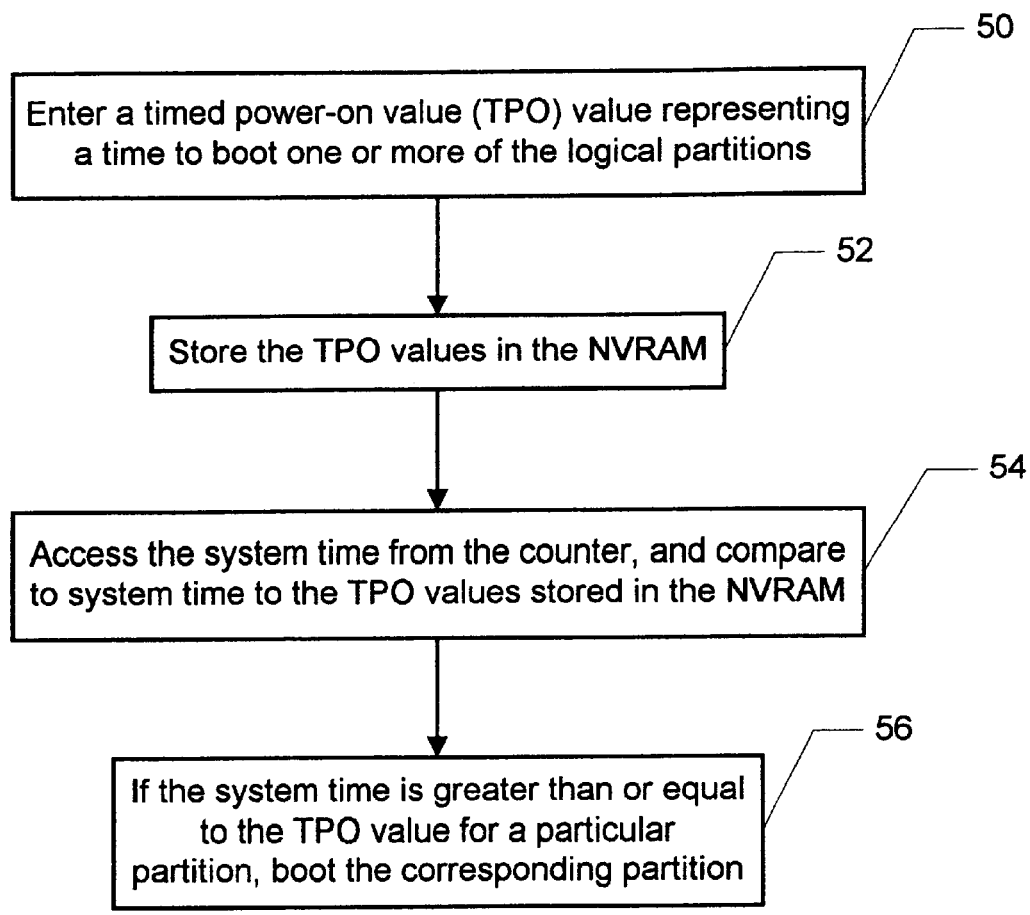
FIG. 2 is a flow chart illustrating a process for providing a timed power-on of logical partitions in a LPAR computer system.

FIG. 2 is a flow chart illustrating a process for providing a timed power-on of logical partitions in a LPAR computer system in accordance with a preferred embodiment of the present invention. The process begins by allowing an operator to enter a timed power-on value (TPO) value representing a time to boot one or more of the logical partitions 12 in step 50. In a preferred embodiment, the operator controls the system 10 through an operating console (not shown) that displays a command entry field for each logical partition 12. The operator may then type-in a timed power-on value (TPO) command, "shutdown-t date/time", at the operator console, where the parameter "date/time" represents the time at which the logical partition 12 should be powered-on. Basically, when a TPO command is issued, it sets a target time that controls when firmware in the control service processor 14 powers-on the corresponding partition 12, as described below.

After the operator enters the TPO value for one or more partitions 12, the TPO values are appropriately formatted to efficiently support fast detection of the time for execution of the TPO event stored in the NVRAM in step 52. Referring again to FIG. 1, in a preferred embodiment the TPO value is stored in a command status table 20 that includes a record 22 for each partition 12 in the system 10. Each record 22 includes a time field for storing the TPO value 24 for the corresponding partition 12. Preferably, the TPO values 24 are stored in the same format as the system time 17 maintained by the counter 16 so that no translations are necessary. If a TPO value 24 has not been scheduled for a particular partition 12, then the timed field in NVRAM 18 for that partition 12 may contain a zero.

Referring again to FIG. 2, at predetermined timed intervals, the control service processor 14 accesses the system time 17 from the counter 16, and compares to system time 17 to the TPO values 24 stored in the NVRAM 18 in step 54. If the system time is greater than or equal to the TPO value in the NVRAM 18 for a particular partition 12 (and if the TPO value is not zero), the control service processor 14 boots the corresponding partition 12 in step 56. The control service processor 14 also clears the TPO value for the partition 12. In a preferred embodiment, the control processor performs the comparison in intervals measuring in minutes.

In a preferred embodiment, the system 10 may operate in LPAR mode and non-LPAR mode. In this case, it is possible for the operator to switch the system between LPAR mode and non-LPAR mode after the system shuts down. If the system 10 is powered on in non-LPAR mode after TPO values have been scheduled in LPAR mode, each TPO value will be cleared without any action when its scheduled time occurs. Any partition TPO value, whose scheduled time has not yet occurred, will remain active in full force in non-LPAR mode, thereby making it possible for some partition TPO values to survive the system mode change.

A method and system for providing a timed restart for the partitions in a logical partition computer system has been disclosed. The present invention allows an operator to issue TPO commands for multiple partitions with different time bases, establishes an accurate base timeline, and starts each partition independently upon the arrival of the scheduled time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a timed power-on of logical partitions in a logical partition computer system, the method comprising the steps of:
    (a) allowing an operator to enter a timed power-on value (TPO) value representing a time to boot one or more of the logical partitions;
    (b) storing the TPO value for each logical partition in nonvolatile memory;
    (c) comparing a system time with each of the TPO values at predetermined timed intervals; and
    (d) booting the corresponding logical partition when the system time is greater than or equal to the TPO value.

2. The method of claim 1 wherein step(a) further includes the step of allowing the operator to enter TPO commands containing the TPO values through an operating console.

3. The method of claim 2 wherein step(a) further includes the step of displaying a command entry field for each logical partition for entry of the TPO command.

4. The method of claim 3 wherein step(a) further includes the step of providing the TPO command as "shutdown-t date/time", where date/time represents the time at which the logical partition should be powered-on.

5. The method of claim 1 wherein step(b) further includes the step of storing the TPO values in a table in the nonvolatile memory that includes a record for each partition in the system.

6. The method of claim 5 wherein step(b) further includes the step of storing the TPO values in a format that supports efficient detection of a time to execute a TPO event.

7. The method of claim 6 wherein step(b) further includes the step of storing a zero in the record of a partition when no TPO value has been scheduled for that partition.

8. The method of claim 1 wherein step(c) further includes the step of maintaining the system time with a 49 bit counter.

9. The method of claim 8 wherein step(c) further includes the step of using a control processor to periodically access the system time from the counter to compare the system time with the TPO values in the nonvolatile memory.

10. The method of claim 9 wherein step(c) further includes the step of clearing the TPO value in the nonvolatile memory for a partition after the partition has been booted.

11. The method of claim 1 further including the steps of:
    allowing the operator to switch the system between LPAR mode and non-LPAR mode;
    if the system is powered on in non-LPAR mode after TPO values have been scheduled in LPAR mode, clearing each TPO value when its time occurs; and
    allowing any TPO value whose scheduled time is not yet occurred to remain active in non-LPAR mode, such that is possible for some TPO values to survive the system mode change.

12. A logical partition (LPAR) computer system, comprising:
    multiple logical partitions, each logical partition having at least one processor, and memory;
    a counter for maintaining system time;
    a nonvolatile memory;
    a console for allowing an operator to enter a timed power-on value (TPO) value representing a time to boot one or more of the logical partitions; and
    a control service processor coupled to the counter and the NVRAM, the control service processor for
        storing the TPO value for each of the logical partition in nonvolatile memory,
        comparing a system time from the counter with each of the TPO values at predetermined timed intervals, and
        booting the corresponding logical partition when the system time is greater than or equal to the TPO value.

13. The LPAR system of claim 12 wherein the operator enters the TPO value in a TPO command through the console.

14. The LPAR system of claim 13 wherein a command entry field is displayed for each logical partitioned for entry of the TPO command.

15. The LPAR system of claim 14 wherein the TPO command comprises a "shutdown-t date/time" command, where date/time represents the time at which the logical partition should be powered-on.

16. The LPAR system of claim 12 wherein the nonvolatile memory further includes a table that includes a record for each partition in the system for storing the TPO values.

17. The LPAR system of claim 16 wherein the TPO values are stored in a same format that supports efficient detection of a time to execute a TPO event.

18. The LPAR system of claim 12 wherein a zero is stored in the record of a partition when no TPO value has been scheduled for that partition.

19. The LPAR system of claim 18 wherein the counter comprises a 49 bit counter.

20. The LPAR system of claim 19 wherein the TPO value in the nonvolatile memory is cleared for a partition after the partition has been booted.

21. The LPAR system of claim 12 wherein the operator may switch the system between LPAR mode and non-LPAR mode, such that if the system is powered on in non-LPAR mode after TPO values have been scheduled in LPAR mode, clearing each TPO value when its time occurs, and any TPO value whose scheduled time is not yet occurred are allowed to remain active in non-LPAR mode, such that is possible for some TPO values to survive the system mode change.

22. A computer-readable medium containing program instructions for providing a timed power-on of logical partitions in a logical partition computer system, the program instructions for:

(a) allowing an operator to enter a timed power-on value (TPO) value representing a time to boot one or more of the logical partitions;

(b) storing the TPO value for each logical partition in nonvolatile memory;

(c) comparing a system time with each of the TPO values at predetermined timed intervals; and (d) booting the corresponding logical partition when the system time is greater than or equal to the TPO value.

23. The computer-readable medium of claim 22 wherein instruction(a) further includes the instruction of allowing the operator to enter TPO commands containing the TPO values through an operating console.

24. The computer-readable medium of claim 23 wherein instruction(a) further includes the instruction of displaying a command entry field for each logical partition for entry of the TPO command.

25. The computer-readable medium of claim 24 wherein instruction(a) further includes the instruction of providing the TPO command as "shutdown-t date/time", where date/time represents the time at which the logical partition should be powered-on.

26. The computer-readable medium of claim 22 wherein instruction(b) further includes the instruction of storing the TPO values in a table in the nonvolatile memory that includes a record for each partition in the system.

27. The computer-readable medium of claim 26 wherein instruction(b) further includes the instruction of storing the TPO values in a format that supports efficient detection of a time to execute a TPO event.

28. The computer-readable medium of claim 27 wherein instruction(b) further includes the instruction of storing a zero in the record of a partition when no TPO value has been scheduled for that partition.

29. The computer-readable medium of claim 22 wherein instruction(c) further includes the instruction of maintaining the system time with a 49 bit counter.

30. The computer-readable medium of claim 29 wherein instruction(c) further includes the instruction of periodically accessing the system time from the counter using a control processor.

31. The computer-readable medium of claim 30 wherein instruction(c) further includes the instruction of clearing the TPO value in the nonvolatile memory for a partition after the partition has been booted.

32. The computer-readable medium of claim 22 further including the instructions of:

allowing the operator to switch the system between LPAR mode and non-LPAR mode;

if the system is powered on in non-LPAR mode after TPO values have been scheduled in LPAR mode, clearing each TPO value when its time occurs; and allowing any TPO value whose scheduled time is not yet occurred to remain active in non-LPAR mode, such that is possible for some TPO values to survive the system mode change.

\* \* \* \* \*